US010417681B2

(12) United States Patent
Butler et al.

(10) Patent No.: US 10,417,681 B2
(45) Date of Patent: Sep. 17, 2019

(54) INDIVIDUALIZED DIGITAL MEDIA DELIVERY SYSTEMS

(71) Applicant: Mediaport Entertainment, Inc., Salt Lake City, UT (US)

(72) Inventors: Jon F. Butler, Sandy, UT (US); Mark W. Nakada, Salt Lake City, UT (US); Michael Hamling, Sandy, UT (US)

(73) Assignee: REALLY EPIC DOG, LTD, Liverpool (GB)

(*) Notice: Subject to any disclaimer, the term of this patent is extended or adjusted under 35 U.S.C. 154(b) by 463 days.

(21) Appl. No.: 14/094,602

(22) Filed: Dec. 2, 2013

(65) Prior Publication Data

US 2014/0089140 A1    Mar. 27, 2014

Related U.S. Application Data

(63) Continuation of application No. 12/136,338, filed on Jun. 10, 2008, now Pat. No. 8,626,668, which is a continuation-in-part of application No. 11/773,540, filed on Jul. 5, 2007, now Pat. No. 9,189,792, which is a continuation-in-part of application No. 11/397,050, filed on Apr. 3, 2006, now Pat. No. 10,210,529, and a continuation-in-part of application No. 11/397,292, filed on Apr. 4, 2006, which is a continuation-in-part of application No. 11/344,917, filed on Feb. 1, 2006.

(60) Provisional application No. 60/667,638, filed on Apr. 4, 2005, provisional application No. 60/672,428, filed on Apr. 19, 2005, provisional application No. 60/672,427, filed on Apr. 19, 2005.

(51) Int. Cl.
*G06Q 30/06* (2012.01)
*H04L 29/06* (2006.01)
*H04L 29/08* (2006.01)

(52) U.S. Cl.
CPC ......... *G06Q 30/0613* (2013.01); *G06Q 30/06* (2013.01); *H04L 63/08* (2013.01); *H04L 63/10* (2013.01); *H04L 67/06* (2013.01); *H04L 67/10* (2013.01); *H04L 67/12* (2013.01); *Y02E 60/366* (2013.01)

(58) Field of Classification Search
None
See application file for complete search history.

(56) References Cited

U.S. PATENT DOCUMENTS 5,482,139 A * 1/1996 Rivalto ............... E04H 3/04
186/36
5,959,945 A * 9/1999 Kleiman ............. G07F 17/305
340/5.74

(Continued)

*Primary Examiner* — Jamie R Kucab
(74) *Attorney, Agent, or Firm* — Loza & Loza, LLP (57) ABSTRACT

Systems and methods for individualized distribution of digital content to purchasers via portable kiosks are described. The systems contain a storage device for storing the digital content and distribution devices for distributing the digital content to a user. The distribution devices can be configured to be portable so that users who are not mobile can access the distribution device. As well, the users can use a receiving device containing unique identification data to receive and access the digital content. Such a system is extremely useful for users who are not mobile and whose use of the distribution devices needs to be controlled, such as detainees in a corrections facility. Other embodiments are described.

19 Claims, 3 Drawing Sheets

(56) References Cited

U.S. PATENT DOCUMENTS

| | | | | | |
|---|---|---|---|---|---|
| 6,308,887 | B1* | 10/2001 | Korman | G06Q 20/18 235/379 |
| 6,318,536 | B1* | 11/2001 | Korman | G06Q 20/18 194/217 |
| 6,577,735 | B1* | 6/2003 | Bharat | G11B 27/034 380/286 |
| 6,595,342 | B1* | 7/2003 | Maritzen | G06Q 20/02 194/212 |
| 6,882,269 | B2* | 4/2005 | Moreno | A47G 29/141 235/383 |
| 6,895,285 | B2* | 5/2005 | Maity | G06F 11/328 700/27 |
| 7,302,465 | B2* | 11/2007 | Ayres | H04L 29/06 709/203 |
| 7,356,771 | B2* | 4/2008 | Paul | G06F 9/54 707/999.003 |
| 7,437,772 | B1* | 10/2008 | Thenthiruperai | H04W 12/08 705/52 |
| 7,603,321 | B2* | 10/2009 | Gurvey | G06Q 10/02 705/50 |
| 7,762,470 | B2* | 7/2010 | Finn | G06K 7/0004 235/380 |
| 2001/0051996 | A1* | 12/2001 | Cooper | G06Q 10/10 709/217 |
| 2002/0105665 | A1* | 8/2002 | Wasilewski | H04N 1/00127 358/1.13 |
| 2002/0107610 | A1* | 8/2002 | Kaehler | G06Q 20/387 700/232 |
| 2002/0161476 | A1* | 10/2002 | Panofsky | G06Q 20/1235 700/231 |
| 2003/0052165 | A1* | 3/2003 | Dodson | H04L 29/06 235/381 |
| 2003/0061271 | A1* | 3/2003 | Pittarelli | H04M 3/493 709/203 |
| 2003/0191714 | A1* | 10/2003 | Norris | G06Q 20/10 705/43 |
| 2005/0075907 | A1* | 4/2005 | Rao | A61B 5/0002 705/2 |
| 2005/0192820 | A1* | 9/2005 | Simon | G06Q 30/0601 369/1 |
| 2005/0259801 | A1* | 11/2005 | Bullard | H04M 3/38 379/144.01 |
| 2005/0289338 | A1* | 12/2005 | Stadlman | G06Q 30/06 713/153 |
| 2006/0249576 | A1* | 11/2006 | Nakada | H04L 67/306 235/382 |
| 2006/0265280 | A1* | 11/2006 | Nakada | G06Q 30/0253 705/14.51 |
| 2007/0156443 | A1* | 7/2007 | Gurvey | G06Q 10/02 705/64 |
| 2008/0033881 | A1* | 2/2008 | Ficco | H04L 9/00 705/51 |
| 2008/0084293 | A1* | 4/2008 | Adelbert | G06K 1/18 340/539.1 |
| 2008/0172243 | A1* | 7/2008 | Kelly | G06Q 30/0251 705/14.49 |
| 2009/0076832 | A1* | 3/2009 | Collins | G06Q 10/00 705/1.1 |

* cited by examiner

Figure 3

INDIVIDUALIZED DIGITAL MEDIA DELIVERY SYSTEMS

CROSS-REFERENCE TO RELATED APPLICATION

This application is a continuation of U.S. application Ser. No. 12/136,338, filed Jun. 10, 2008, the entire disclosure of which is incorporated by reference into the specification in its entirety.

FIELD

This application relates generally to systems and methods for delivering digital content to users. In particular, this application relates to systems and methods for individualized distribution of digital content to purchasers via portable kiosks.

BACKGROUND

Many types of information and content are now stored digitally, including books, music, movies, software programs, video games, databases, advertisements, as well as other content. Because such content is stored digitally, it can be transferred easily using many types of electronic networks. See, for example, U.S. Pat. Nos. 5,875,110, 4,412,292, 5,848,398, 6,397,189, 6,381,575, 4,674,055, 5,445,295, 5,734,719, 6,286,029, 6,799,165, 6,655,580, 6,330,490, 6,662,080, 6,535,791, 6,711,464, 5,237,157, 6,654,757, 5,794,217, and 6,748,539. Both private and public electronic networks, including the Internet, are frequently used to transfer the digital content.

Often the digital content is transferred electronically so that it can be sold to a user who is not located where the digital content is originally stored. The digital content can be sold for a variety of purposes, including education, entertainment research, or other purposes. The digital content may be sold in any number of technological formats known in the art that permit storage and retrieval of the digital data, including floppy discs, compact discs (CDs) of several varieties; video discs of several varieties, including digital, video discs (DVDs); magnetic storage devices using a variety of forms and technologies; and solid state devices of several varieties.

Most digital content sales have been to users of computers that are connected to each other via electronic networks of various types, e.g., the Internet. However, users are not always located at such a computer when they desire to purchase the digital content, or they have a computer but it is not connected to such a network. Consequently, sales (including rentals) of digital content have begun using devices in remote locations, including stand-alone devices (such as kiosks) in retail or other high-traffic areas. The stand-alone devices may be attended or unattended.

SUMMARY

This application describes systems and methods for individualized distribution of digital content to purchasers via portable kiosks. The systems contain a storage device for storing the digital content and distribution devices for distributing the digital content to a user. The distribution devices can be configured to be portable so that users who are not mobile can access the distribution device. As well, the users can use a receiving device containing unique identification data to receive and access the digital content. Such a system is extremely useful for users who are not mobile and whose use of the distribution devices needs to be controlled, such as detainees in a corrections facility.

BRIEF DESCRIPTION OF THE DRAWINGS

The following description can be better understood in light of the Figures, in which.

Together with the following description, the Figures may demonstrate and explain the principles of the systems and methods for individualized distribution of digital content to users via portable kiosks. In the Figures, the thickness and configuration of components may be exaggerated for clarity. The same reference numerals in different drawings represent the same element, and thus their descriptions will not be repeated.

DETAILED DESCRIPTION

The following description provides specific details in order to provide a thorough understanding. The skilled artisan, however, would understand that the systems and methods can be practiced without employing these specific details. Indeed, the systems and methods can be practiced by modifying the illustrated system and method and can be used in conjunction with apparatus and techniques conventionally used in the industry. While the systems and methods are described for use with a kiosk as a distribution device, the distribution device could include other types of devices, such as vending machines, automated teller machines, coin- or card-operated communications machines (e.g., telephone machines/booths), or remote terminals located in a secure or unsecured public space such as a library, hallway, or outdoor vending area.

The systems contain a first device in a first location where the digital content can be stored and managed and a distribution device in a second Location for delivering the digital content to a user (including a purchaser). In some embodiments, the systems can be illustrated by FIG. 1 where the system 5 contains a first (or storage) device in a first location that stores the digital content and can transfer the digital content to a second (or distribution) device in a second location. The digital content can then be distributed from the second device to a user.

Figure 1:
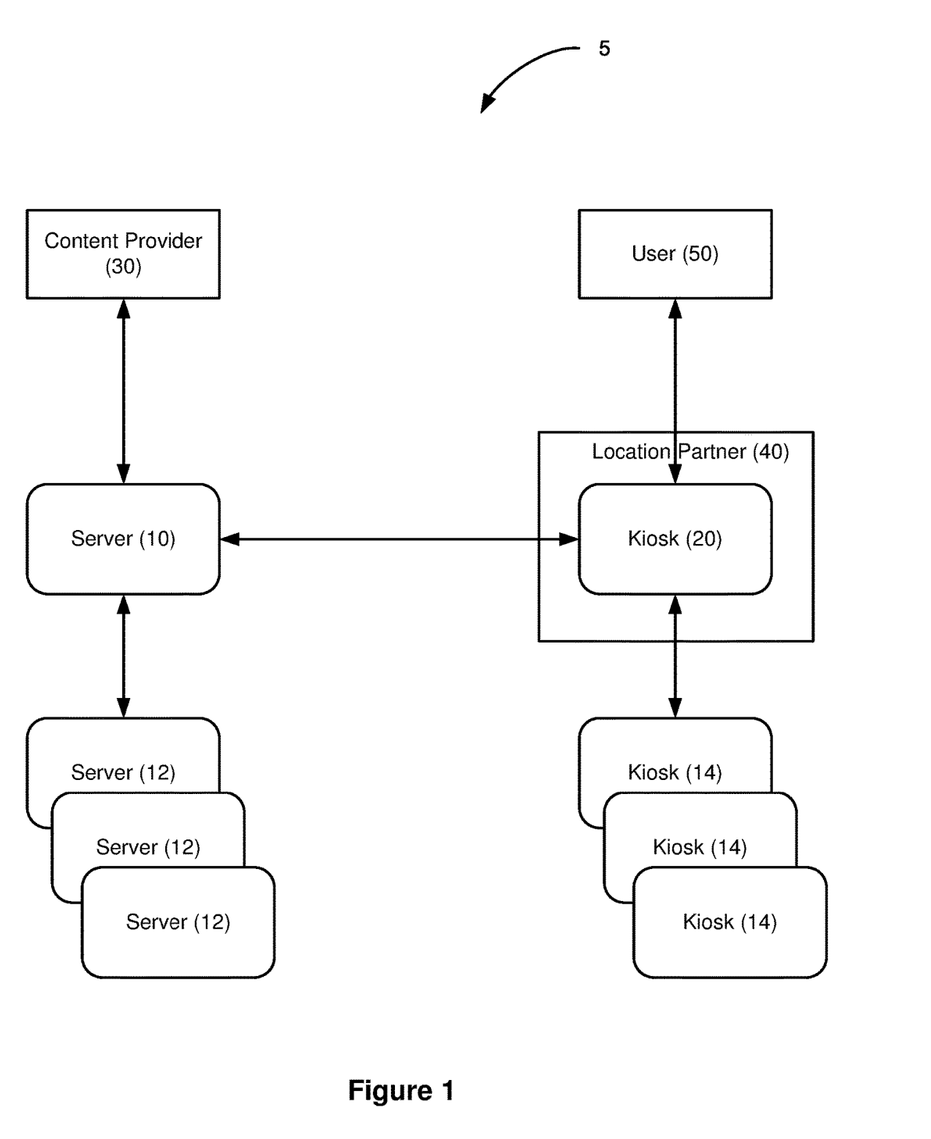
FIG. 1 depicts an exemplary system for distribution of digital content.

Prior to discussing the details of system 5, it should be understood that the following description is presented largely in terms of operations that may be performed by conventional computer components. These computer components, which may be grouped in a single location or distributed over a wide area, generally include computer processors, memory storage devices, display devices, input devices, etc. that are known in the art. In circumstances where the computer components arc distributed, the computer components are accessible to each other via communication links, such as those illustrated in the Figures. The system 5 could equally operate within a computer system having a fewer or greater number of components than those illustrated in the Figures. Thus, the depiction of system 5 should be taken as illustrative and not limiting. For example, the system 5 could implement various services components and peer-to-peer network configurations to implement at least a portion of the processes.

The first location can be located anywhere desired by the operator, i.e., in a central location (with central not referring to the geographic location). The first device acts as a repository for any desired digital content. The first device also permits an operator or administrator of the system 5 to manage all of its operations at a centralized location, permitting roll-out of digital content (and the related materials described herein) across all or select distribution devices and real-time feedback from each distribution device as to its use and functionality.

Any device that can operate in this manner can be used as the first device. One example of the first device comprises a server 10. Any type of server known in the art can be used as server 10. Examples of servers that can be used include a computer running a UNIX-style operating system, a computer running a Microsoft Windows operating system, or a personal computer workstation. The server 10 comprises any storage component on which the digital content can be stored. Examples of storage components include optical storage discs, DVD-RAM discs, and traditional magnetic hard disc drives.

Another example of a storage component includes any known database (or combination of databases). The database stores information regarding the digital content and any user interaction with the system. For example, the database stores data regarding the content inventory at each of the distribution devices. The database can also store sales information, user information, and transactional information. The database may be a Microsoft SQL database, a Microsoft Access database, an Oracle database, a MySQL database or combinations thereof.

In some aspects, multiple servers 12 may be connected together to make a server cluster. Using a server cluster permits sharing information regarding the content stored on each server 10 and each transaction the server 10 has recorded. By using a server cluster, the system 5 is always operational, regardless of the location of a particular component on the network that connects the components (such as the Internet). The server cluster can contain a primary cluster, which handles all critical tasks, with minor functions being routed to a secondary cluster. With this configuration, if the primary cluster is not operational, most functions can be handled by the secondary cluster. A server cluster also allows for large-scale deployment and interoperability, as well as data that can be stored on the network in multiple points of co-location.

The software components required for operating the server 10 may be included on a single server or on multiple servers, with each server implementing one or more tasks and communicating among themselves using standard networking protocols. Non-limiting examples of the server-focused tasks using the software components that may be implemented on one or more servers 10 include those of e-mail server, Web server; file server; purchase transaction authentication server; transaction push server; monitoring server; content management server; content synchronization server; content security server; and advertising/promotional message server.

As depicted in FIG. 1, the server 10 manages and stores digital content. The types of digital content that can be stored (and then delivered to a user) are virtually unlimited. Examples of the digital content include music, movies, video games, software, mobile phone ring tones, electronic books, advertising, and other types of content. The format in which the digital content is stored is also virtually unlimited. Examples of the types of digital formats include pdf, doc, xls, jpeg, tiff gif, xbm, pnm, mpeg2, mpeg4, mp3, oma, m4a, wma, wmv, mov, wav, and avi, as well as combinations thereof. The digital content can also be provided in any known language.

The digital content may be provided internally (by the entity that controls or operates the system 5), or externally by one or more third parties that are the copyright owners of the content or that act on behalf of the owners of the content (collectively, content providers 30). Non-limiting examples of content providers 30 include music publishers, video publishers, recording companies, movie studios, television studios, book publishers, artists, performers, end-users, mobile telephone companies, video game manufacturers, and advertisers. Content providers 30 may provide the content to the server using any known mechanism, including via wired or wireless network connections known in the art or via other methods, such as merely providing a CD or DVD to the operator of the system.

The digital content can include instructions indicating how the content may be used, distributed, sold, transmitted, or otherwise processed (use instructions). The server 10 can convert such use instructions into digital rights management (DRM) information that can be associated with any desired content. The DRM information may include any number or combination of restrictions, including those that are enabled by a DRM technology and that are selected by a content provider 30. Non-limiting examples of DRM restrictions include a restriction that visual or textual content not be printed in hardcopy; a restriction that copy-and-paste functions are disabled for textual content; a restriction that a music file may not be played after a certain date; a restriction that a music file or video file may only be played a fixed number of times; and a restriction that a file may only be copied to another device a fixed number of times. Other examples include variable pricing, variable billing, and variable payment methods.

The DRM information may be provided by a third party (such as content provider 30 or location partner 40) or by the operator of the system 5. Either may assign a unique transactional ID to each piece of digital content. This unique transactional ID correlates to a set of use instructions and DRM specifications to control how the associated content is managed on devices, such as on the server 10, as further described hereinafter. The digital content may therefore contain metadata (i.e. metatags), use instructions, and a transactional ID.

The metadata (i.e., metatags) can correspond to information about any desired content, such as a genre of music or movie, an artist, a content provider, content release date, or otherwise. The metatags may be provided by a content provider 30 or created by the operator of the system. The metatags may indicate the use instructions for all content that is provided, with distinct use instructions for each piece of content, or with use instructions based on parameters that can be used to classify content. In one example of use instructions, a content provider 30 may indicate that music performed by musical artist A may be redistributed freely, without restriction, music performed by musical artist B may be redistributed freely when purchased at a set price, and music performed by musical artist C may be redistributed in a manner that permits the music to be copied to another computer three times, after which the music may not be copied to another computer, but only played (performed) on a computer where it is stored.

The digital content may optionally be encrypted in a manner to increase security of the content during storage on a server 10 or on a distribution device, or during transfer between a content provider 30 and a server 10, or between a server 10 and the distribution device. Any number of encryption methods known to those in the art may be used to implement this feature. Examples of such encryptions include both symmetrical and asymmetrical encryption using a variety of methods, including RSA, DES, Triple DES, AES, Blowfish, ElGamal, RC4, and others.

When the distribution device is placed in a location that is remote from the first device, a location partner (or provider) 40 can optionally be used in the system 5 as depicted in FIG. 1. The location partner 40 comprises an individual or entity that provides a space where the delivery device may be physically located. Non-limiting examples of such location partners include owners, operators or managers of airports, bars, clubs, schools, gyms, stadiums, arenas, amusement parks, military bases, retail centers, retail stores or shops, convenience stores, eating establishments, correction facilities, passenger ships, retirement homes, military ships, travel centers or stops, and libraries. In some embodiments, the location partner comprises a correctional facility, such as a prison, jail, juvenile detention facility, minimum-security detention facility, or psychiatric institution.

A location partner 40 may provide this space without charge, as a service to individuals that visit the space where the distribution device is placed. Or the location partner 40 may provide this space in exchange for a fee of some type, or in exchange for advertising time or space on the distribution device, or for other benefits. In some embodiments, the location partner 40 may control or limit the content that is available via the distribution device. In other embodiments, the location partner can also control the advertising at the distribution device.

As described above, the system also contains a distribution device that can be located in a second location that is optionally remote from the first location. The distribution device receives the content from the first or storage device and then distributes that content to a user (i.e., a purchaser). Any device operating in this manner can be used as the distribution device. In some embodiments, the distribution device comprises a vending machine or a kiosk, such as the kiosk 20 illustrated in the Figures.

Kiosk 20 provides a point-of-sale (or rental) experience for any user, including both actual and merely potential purchasers of the digital content. Any person can be a user by interacting with the kiosk 20, whether by purchasing content or merely viewing the kiosk 20 and/or the content on the kiosk, such as by sampling music contained in the kiosk. The kiosk 20 used in the system can be any kiosk known in the art or the kiosk described below. In some embodiments, the kiosk may physically display any known advertising, such as posters, banners, or adhesive advertisements. The kiosk 20 may also be used in conjunction with products as a point-of-purchase display.

The kiosk 20 can contain any combination of number of video displays. In some embodiments, the kiosk 20 contains two video displays, a first video display that displays advertising messages and a second video display that displays menus, samples of content, and related information appropriate to affect a purchase by an end-user of the content made available through the kiosk 20. In other embodiments, though, the kiosk can contain only one video display, as well as three or more video displays. The video display can comprise any known displays, including LED displays, TFT displays, LCD displays, CRT displays, touchscreens, and combinations thereof.

The kiosk 20 can also contain multiple input and output devices appropriate to interact with a user, display or perform the content stored on the kiosk 20, and complete a sales transaction related to the content. These input and output devices may include, for example, one or more of any of the following: a keyboard; a mouse; a trackball; a joystick; a touchscreen; a label maker; an automatic coupon feeder; a barcode scanner; an image seamier; biometric scanning devices such as a fingerprint, voiceprint, hand geometry, or retinal/iris scanner; a Compact Disc reader; a Compact Disc writer; a video disk reader; a video disk writer; and media device connectivity, including a USB port, an IEEE-1394 FireWire port, a SecureDigital (SD) port, a CompactFlash port, a PCMCIA port, a Memory Stick port, a laser printer, a receipt printer, a video camera, a camera, an audio recorder, a credit/debit/gift card reader, a cash acceptor, a coin acceptor, a check acceptor, a jewel case ejector, a phone docking station, speakers, voice recognition device, signature verifier, facial recognition device, Braille input device, bubble sheet/multiple choice form scanner (such as a Scantron machine), Bluetooth communications, Wi-Fi communications, Wi-Max communications, and other input or output device known in the art. Furthermore, additional input, output, and storage technologies known in the art may be integrated with the kiosk 20, including any and all mobile or portable devices.

The kiosk 20 can also include a controlling device that operates the video displays, internets with input and output devices, and communicates with other kiosks 20 or servers 10, in real-time or as needed. In some embodiments, the controlling device includes two or more computers, either sharing or dedicated to the needed tasks requisite to controlling operation. In some configurations, one computer handles the display, selection, and processing of content purchase transactions and a second computer handles the remainder of the tasks required of the kiosk.

Figure 2:
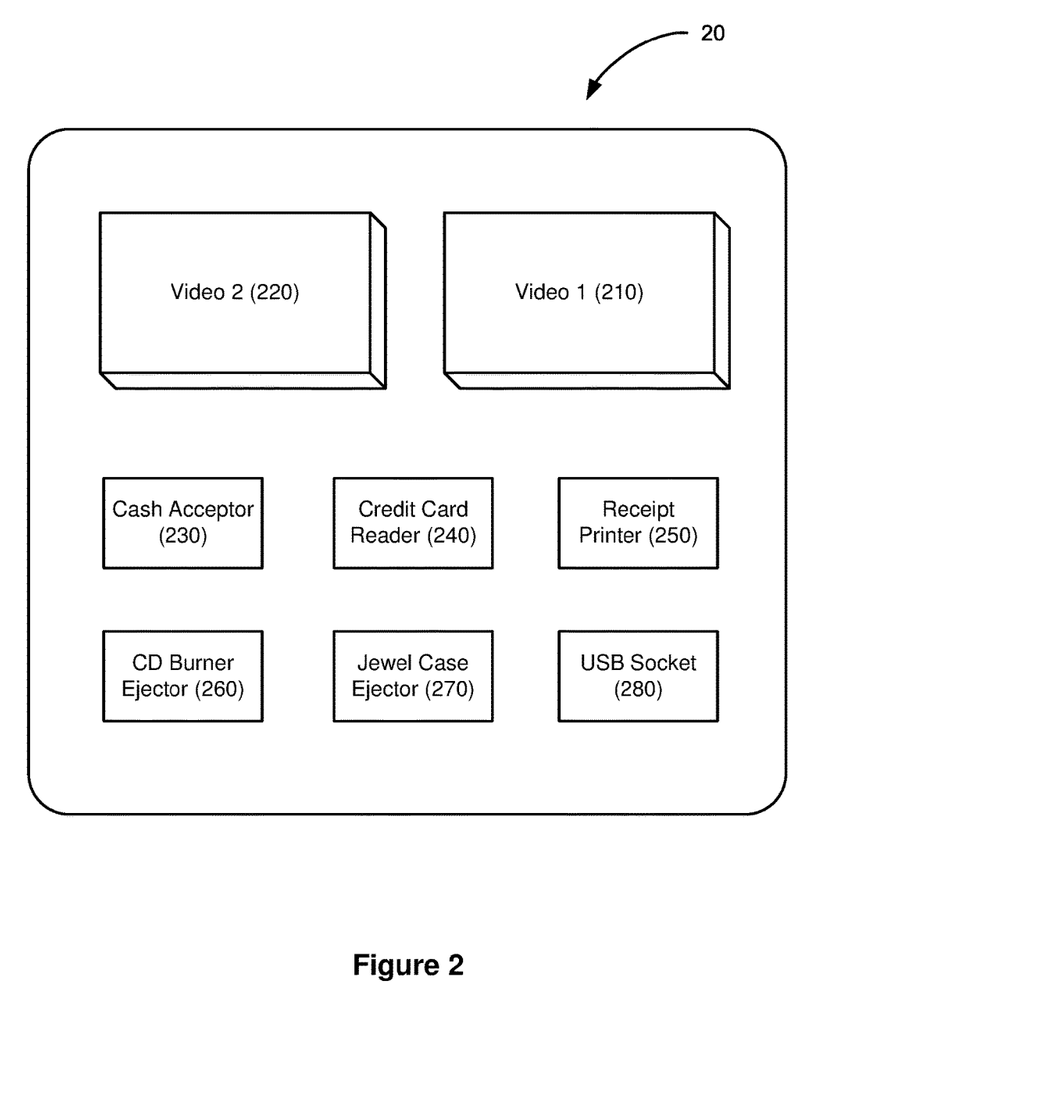
FIG. 2 illustrates the components in some embodiments of an exemplary distribution device.

FIG. 2 illustrates one example of kiosk 20. In FIG. 2, kiosk 20 contains a video display 210 on which advertising or promotional messages are displayed; a video display 220 comprising a touch screen device through which a user may view and select cement; a cash acceptor 230 through which a user may make payment for content; a credit card reader 240 through which a user may make payment for content; a receipt printer 250 that dispenses a paper receipt of a transaction when content is purchased; a CD burner ejector 260 that dispenses an audio CD containing content selected by an end-user during a purchase transaction; a jewel case ejector 270 that dispenses an empty jewel case for holding an audio CD; and a USB socket 280 to which an end-user may connect a device for delivery of content, as described herein. As noted previously, a kiosk 20 may contain different—or additional—components than those shown in FIG. 2, including an end unit that comprises a mobile or portable device.

In some embodiments, the video displays of the kiosk 20 incorporate known touch screen technology. Thus, it can provide a user interface that presents a visual display of pertinent information during the interaction and distribution processes, as well as operate as a user interface for entry of user commands. In some embodiments, the kiosk 20 also includes any known audio technology, such as speakers or headphones.

The kiosk 20 can include a user-friendly interface, including a graphical user interlace with a touch screen capability. If desired, multiple interfaces can be incorporated in the kiosk situated at high traffic locations, such as by being positioned on each side of the kiosk. The user interface comprises a hierarchy of pages that a user navigates through to accomplish different tasks. For example, a user may search for a specific song, title or artist, and once the user's selection is found, the selection may be sampled, and optionally purchased. The same process applies to all digital content types where a user can interact with the kiosk 20 to accomplish different tasks associated with the content.

In some embodiments, the kiosk 20 is located in a fixed location. In these embodiments, the kiosk 20 is secured in just a single location and remains in that location. The kiosk 20 can be secured in any known manner, i.e., by bolting to a floor or wall or by locking the kiosk in that location. Typically, the kiosk 20 stays in that single location until it is removed by the operator of the system 5.

In other embodiments, though, the kiosk 20 can be made portable. Such a configuration allows the kiosk to be moved to a user who is not mobile, i.e. a handicapped user or a detainee in a corrections facility. The kiosk 20 can be made portable using any mechanism known in the art, i.e., by placing wheels on the bottom of the kiosk. Where the kiosk is portable, though, it can be provided with a wireless communications capability that may not be needed where the kiosk remains in a fixed location.

When a user purchases content through a kiosk 20, that content is made available to the user using any receiving device known in the art. The receiving device can be provided by the kiosk 20 or can be provided by the user. Non-limiting examples of some content receiving devices can include playback devices or storage devices. Examples of the playback devices include portable computers, MP3 players, MP4 players, iPods®, video players, or mobile/cellular phones. Examples of the receiving devices include portable computers, mobile/cellular phones, pagers, text messaging devices, calendar or text information devices, recordable media such as memory chips and cards, CDs and DVDs (or similar video or data discs), writeable data CD such, as WORM or CD-RAM, flash drives, USB sticks, or flash memory storage devices. The media content may be stored on these receiving devices magnetically, optically, or electronically as well as any other storage mode known or contemplated in the art. In some aspects, the digital content can be placed on a receiving device, along with migrated plug-ins or software that can be used to play the digital content received.

In some embodiments, the receiving device can be customized or individualized for a specific user. In these embodiments, the receiving device for a particular user can be provided with unique identification data that identifies that particular device and, in some instances, the specific user of that device. The unique identification data can include any data that is used to identity the specific receiving device, such as a user number identifier, an institution identifier, a unique alphanumeric identifier, a unique serial number, or combinations thereof. The unique identification data can also include data for the user, including bio-information like fingerprints, retinal identifiers, or voice recognition identifiers. In some instances, the unique identification data can be coupled to work only with a specific kiosk 20.

The receiving device can also be configured so that the unique identification data links the particular receiving device to a specific user so that the receiving device operates only when the specific user is verified. In this configuration, the receiving device contains a biometric component that is coupled to the bio-information of the specific user to which the device is given. For example, the receiving device could be configured with a fingerprint scanner that reads the fingerprints of the user holding the receiving device. The receiving device can then be activated when the fingerprint of the owner matches the fingerprint that is stored in the receiving device as part of the unique identification data. Other examples of the biometric components that could be used include a retinal identifier, or voice recognition identifier.

The unique identification data can be useful in instances where access to the kiosk—and therefore the system—needs to be limited and/or customized for specific users. For example, for specific users (or even categories of users), the access time can be limited by first, a given amount of time for each interaction (i.e., a timed session), second, only so many interaction within a given time period (i.e., only twice a day), and/or third, access is limited to specific periods of time (i.e., between the hours of 1:00 pm and 3:00 pm). Access may also be restricted if a user's account has no credit left on the account, or after several unsuccessful attempts to access the account have been tried.

The unique identification data can be useful in instances where the content needs to be limited and/or customized for specific users. In other words, the unique identification data can be used to personalize the content for a specific user. For example, for a user who is a detainee at a corrections facility, the content offered to such a user could be limited to an approved list of content by the corrections facility. In this example, such digital content could be limited to rehabilitation or non-violent content.

The various components of the system can be electronically connected to each other using any means known in the art. In some embodiments, the system 5 contains a computer network. Computer networks are well known in the field of communications. Computer networks may include communication links that extend over a local area or a wide area, or even be global. Examples of these connections include Ethernet, frame relay, DSL, satellite uplink, cable modem, analog modem, fiber channel, infrared and microwave transmissions, wireless communications of various types, and other wired or wireless networking technologies known in the art. Such connections may also be constructed through a publicly accessible network, such as the Internet, so long as appropriate security measures, as are known in the art, are used to prevent unauthorized access to the content that passes across the connection. A private network connection may also be used in order to reduce the reliance on such security measures and to further ensure the integrity of content that is transferred via this connection.

The various components of the system are able to communicate with each other whenever needed. In some embodiments, the server 10 and any kiosk 20 may communicate at regular or scheduled intervals, in real-time, or in an ad hoc manner according to needs that arise as determined by the server 10 or the kiosk 20. Since actual real-time communication may be limited by the transmission speeds available, the communication may be on a substantial or near real-time basis.

In some embodiments, the various components of the system need not be electronically connected. For example, the kiosk 20 need not be connected to the server 10 on a continuous basis. Rather, the kiosk can operate in a stand-alone mode, with digital content being transferred to the kiosk 20 via non-networked means, and purchase transactions and data being collected via non-networked, intermittent means. A stand-alone kiosk 20 can be used, for example, when security procedures or network connectivity are not available, such as a kiosk 20 located in a corrections facility.

The systems described above can be used to transfer the digital content from the first device to me distribution device, where it then can be optionally distributed to an individual user via the receiving device. While the digital content can be transferred by the system in any manner, in some aspects, it can be transferred in a semi-dynamic manner, dynamic, or even static manner. The digital content can also be transferred to any distribution device (or group of devices) at once or one at a time.

When the digital content is transferred from the server to the kiosk, the operator of a server 10 may customize which content (or category, group of content, or advertising) is transferred, customize which content is transferred from a server 10 to a particular kiosk 20 (or to a collection of multiple kiosks 14), as well as customize the billing. For example, the operator may limit any content that is available to users in a correction facility. Of course, the location partner (i.e., the corrections facility) itself could be involved in limiting the content to users located within the facility.

When a user views the kiosk, purchases content, or otherwise interacts with the kiosk, the kiosk may collect any desired type of data (collected data). Some examples of collected data may include data about the individual user (user data), data about the users interaction with the kiosk (kiosk data), data concerning the demographics of the kiosk location (location or demographic data), and so forth. The kiosk (or other distribution device) may collect the data in any manner known in the art.

For example, during the user's interaction with the kiosk, the kiosk may gather user data. User data may include any information that relates to the user and/or the user's activities. One example of user data may include conversion data, such as pages viewed, images viewed, color schemes viewed, time of viewing, time of viewing in relation to purchase, content 16 or item(s) purchased/downloaded, requests made, demos/games played, registrations, signups, advertisements viewed, and so forth. Another example of user data may include user-browsing activities, such as content viewed, content selected, time spent viewing different content, and total interaction time. Yet another example of user data may be demographic information, such as the user's age, sex, ethnicity, race, marital status, household size, schooling/education, income, profession, languages spoken, citizenship, and the like. Still another example user information may include survey data, such as consumer satisfaction surveys, event expectation surveys, post-event evaluation surveys, polling/voting data, and so forth. Another example user data may include user preference data, such as user selected color schemes, content preferences, advertisement preferences, e-mail preferences, and the like. Another example of user data includes user-indicated items of interest such as forms and genres of entertainment and hobbies. In yet another example, user data may include user account information, such as username, password, address, phone number, e-mail address, unique login identifiers, cookies, user specific survey/conversion data, etc. In still another example, user data may include biometric data, such as fingerprints, voiceprints, hand geometries, retinal/iris scans, signature verifications, facial recognitions, video feed of end-user, pictures taken of end-user, audio recordings, and the like. Moreover, additional information may be collected and/or extrapolated from the any information/data that has been input by the user.

In some embodiments, the data obtained from the user can include the user's email account. That account can be used to further customize the kiosk experience for the user. As well, that email account can be used to allow the user to receive additional electronic advertising, including notices of upcoming content, events, products, and similar topics. The user's email account may also be used when sharing the information among a community to which the user belongs. In some instances, the user can have a membership whether or not the user has an email account. For those users having a membership, the interaction can be customized. The member can enter his/her membership when prompted and can then be presented with customized menus based on past interaction/sales patterns.

The collected data also includes kiosk data. The kiosk data can include any of the user's interaction with the kiosk including, as non-limiting examples, the following: the areas of the content navigation system visited by the end-user; the advertising content displayed immediately prior to and during the end-user's interaction with the kiosk; the advertising content displayed immediately prior to and during the end-user's purchase from the kiosk; the nature of the delivery device selected by the end-user; method of payment, and others. For instance, the kiosk data may also include sales transaction data, which may indicate purchases contemplated or completed by the end-user, content sold, content price, royalty information, license numbers, inventory ID numbers, transactional IDs, etc.

The collected data may also include location or demographic data. The location data may relate to the demographic environment at the location of the remote device, i.e., print/design advertising or products associated with remote device, kiosk location, seismic/meteorological activity, local advertisements, local artists, local event calendaring, and so forth. And where the kiosk is a portable kiosk, the location or demographic data could also include specific information about location, i.e., the corrections facility.

The collected data may also include other types of data than these categories. Examples of other types of data include payment information, security information, sales information, credit/debit/gift card information, promotional/discount codes, accounting information, and so forth. Examples of the security information could include a password (or passwords), or a user ID number, unique user name, or a thumb or fingerprint identifier.

The kiosk can operate in either a continuous or a batch mode. In the continuous mode of operation, the collected data for each transaction is transmitted quickly from the kiosk to the server. Then, the collected data is deleted from the memory of the kiosk without storing the data at that particular kiosk. In the batch mode, the collected data for each transaction is retained at the kiosk until such time as the kiosk transmits all of collected data at once. This batch mode could be useful in the instances where the kiosk is portable and does not have any wireless communications ability. The kiosk can operate and retain all of the data from interactions with users in fixed locations and then transfer mat data when the kiosk itself is returned to a fixed location.

All of the collected data from the distribution device(s), Web portal, and/or Web page can be used for numerous purposes. In some aspects, the collected data can be used to enhance and/or customize the operation of the system. In other aspects, the collected information can be part of the general and specific market research data that can be used by the operator of the system as known in the art. In yet other aspects, the collected information can be used to customize the content and/or the advertising provided to the external party. For example, the collected data can be used to customize the content delivered to the kiosk or be used to predict the types/genre of media that wilt be popular to a given user. Alternatively, the collected data can be used to customize the digital content by the time of day, the geographic location, etc.

The collected data can be used to customize the advertising directed to the user. The advertising may include messages used to market, promote, or self products or services; or to enhance brand recognition, as well as naming materials, entertainment content, community or location information, and other similar materials. The advertising may also include video clips, audio clips, ring tones, printed coupons, promotional codes, brochures, literature, images, giveaways, discounts associated with, digital content, or other promotional or brand-related content. In some embodiments, the advertising may be presented through video and/or audio presentations, animated PowerPoint presentations, flash programs, banners, pop-ups, screen-savers, wallpapers, posters, digital sampling, cost-per-pixel, cost-per-click, advertisement images, printed advertisements, trademarks and other similar advertisements. One example of the advertising includes the promotion of artists or performers, whose products or content are available for sale on the kiosk. In still another example of the use of the collected data, it may be used in any method of viral marketing.

The user does not need to be physically present at a kiosk to internet with it. The user can internet with the kiosk via a Web page or Web portal that is in communication with the system 5. In some embodiments, this communication can comprise a wired connection, such as a user accessing the Web page or Web portal via a desktop computer. In other embodiments, though, the communication can comprise a wireless connection, such as a user accessing the Web page or Web portal via a portable electronic device, like a laptop computer, a cellular telephone, or other portable electronic device.

Figure 3:
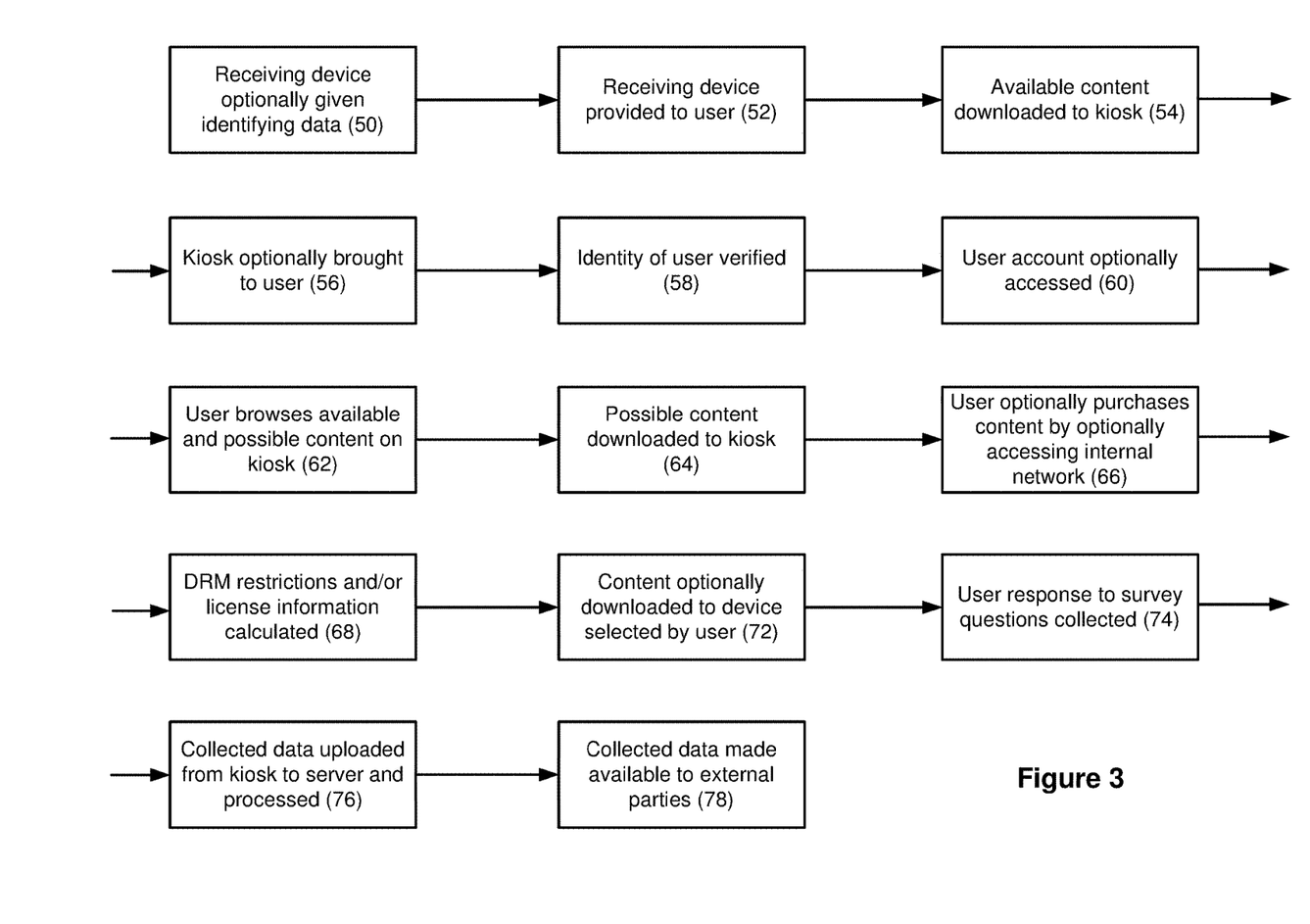
FIG. 3 illustrates an exemplary method of distributing digital content.

The systems described above can be used to perform numerous methods for distributing digital content to a user. One example of a distribution process is illustrated in FIG. 3. Nevertheless, one skilled in the art will appreciate that many variations are possible as to the processes followed by a particular user, that the following process need not be followed sequentially, and that some of the listed procedures are optional. This exemplary process begins in block 50 when the receiving device can optionally be installed with the unique identification data. This installation process can be performed using any known procedure in the art. For example, when the unique identification date comprises a unique serial number, the receiving device is given that serial number.

The process continues in block 52 when the receiving device is provided to the user. In some embodiments, the receiving device can be provided to the user when it is purchased. In other embodiments, receiving device can be provided free of cost to the user by the operator of the system or even the location partner. For example, when the location provider is a corrections facility, the receiving device can be provided at no cost to the user so the user can access the kiosks that are located at the corrections facility. The receiving device can be provided with some digital content or with no digital content on the device when it is given to the user.

The receiving device can also contain the following optional features. First, the receiving device can be the only device that can connect to the kiosk in this environment (e.g., correctional facility). Second, the receiving device would not be able to connect to any other system, kiosk, computer, or device. Third, the receiving device may have other features like a radio. Fourth, the receiving device has the capability to delete content, and then use the system to replace the content on that device a specific number of times. Fifth, the receiving device cannot transfer and digital content to any other devices. And sixth, the receiving device may require a password or unique identifier to activate the content. As previously noted, the receiving device would contain unique identifiers that would be used to limit access to the kiosk 20, and protect unauthorized use of the device.

The process exemplified in FIG. 3 continues when digital content is transferred from the server to the kiosk, as shown in block 54. Initially, since only a certain amount of digital content can be stored on a kiosk, only a specified amount of content that is initially available is transferred to a kiosk. This available content is immediately accessible to a user. In some embodiments, such as where the kiosk is located in a corrections facility, this available content is controlled by the location partner. As well, the available content available in a corrections facility could be controlled by the friends or family of the user.

This process continues when the user accesses the kiosk. In the embodiments illustrated in FIG. 3, this access is performed by the optional procedures in blocks 56, 58, and 60. In block 56, a user (such as a detainee) might be restricted to a relatively fixed location (such as a cell or a room) and, in these instances, a portable kiosk might need to be brought to that fixed location. Of course, in other instances, the user is not restricted to a fixed location and is free to move to the kiosk, which itself can optionally be located in a fixed location.

Once the user is physically located near the kiosk, the identity of the user can optionally be verified, as shown in block 58. This verification can be performed either by the kiosk, by the receiving device, or a combination of both of these components. The verification can be performed by the kiosk by using any known biometric identification procedures, including fingerprints, eye scanners, voice recognition, or taking a picture or video of the user and comparing it against a database of users, the data embedded and stored on the device, or through third party verification. The verification can also be performed by the receiving device when it is activated using the unique identification data. The verification can also be performed by a combination of the kiosk and the receiving device when a match is provided between the user's biometric information provided to the kiosk and the biometric information stored on the receiving device. The final procedure that can be used to provide a user access to the kiosk can optionally include access to a user account. This final procedure can be used when the user has an account with the system. In this procedure, the user can access his or her account by providing the correct information needed for the account, i.e., a username and the accompanying password (or a personal account number and a PIN).

At block 62 in FIG. 3, the user can optionally view advertising on the first video screen and may optionally begin to use an input device (i.e., touchscreen display) located on or adjacent to the kiosk to navigate among a collection of available content on the kiosk. At that point, the user may optionally experience samples of the available content via the first or second video screen or another output device located on or adjacent to the kiosk. For example, the user can listen to the first 30 seconds of a music file that is available for purchase via the kiosk (or that is available anywhere in the system). As well, the user can view any possible content that is located in the system and could be downloaded to the kiosk.

The process continues, as shown in block 64 of FIG. 3, when the possible digital content (that is not already present at the kiosk) can be transferred to the kiosk at the request of the user. Where the kiosk is a portable kiosk, the digital content is transferred through any wireless communication method. In some instances, such as where the content on the kiosk is limited by the location partner, the user might need to seek authorization before the possible content is transferred to the kiosk and is then available for sampling or purchasing by the user.

Next at block 66, the user can then optionally select the content to be purchased, typically by paying a purchase price, and entering payment information as appropriate to the transaction. This payment information can then be verified in real Use user can take advantage of any number of payment methods, i.e., cash, credit, debit, promotions, loyalty programs, reward programs, etc. In some embodiments, such as where the kiosk is located in a corrections facility, the payment could be made by the friends or family of the user.

In some configurations, such as where the kiosk is controlled by the location partner (i.e., a corrections facility), this payment process can include an additional process of coordinating the payment with the location partner. These configurations can be helpful where the user does not have access to any payment method and instead the payment is managed by the location partner. In these configurations, therefore, once the purchase decision has been made, the payment process is handled when the kiosk connects to the location partner's accounting system to determine how much money is available to the user and then extracts the appropriate payment for that user. These configurations thereby allow the location partner to control the amount of money spent by the user and thereby control the amount of digital content accessed by the user.

At block 68 in FIG. 3, the method may continue when DRM restrictions and/or license information are calculated as needed and associated with the digital content that was selected for purchase. In some instances, such as where the kiosk is located within a corrections facility, the license information contains security data about the user, as well as unique biometric information about the user.

As shown at block 72, the user can provide the receiving device containing the unique information data onto which the content 16 will be transferred. Then, the content 16 may be delivered to that device. The user may continue to input information during the remainder of the transaction. For instance, block 74 shows that after the user has selected a receiving device for the purchased content, the user may answer a survey or in other way reveal user data, kiosk data, location data, or any other information. This process may optionally be completed while payment information is being authenticated, while content is being downloaded in real-time (if necessary), and while content is transferred from the kiosk to the receiving device.

At any time during the interaction, the kiosk may gather collected data from the user. The kiosk may gather any desired information (i.e., user data, kiosk data, and location data) at any point in the method when that data is available for collection. The kiosk 20 may then assemble the user data, kiosk data, location data, and any other information into the collected data and communicate it to the server 10 (or any other device), as shown at block 76. When the server 10 receives the collected data, it may be optionally collated, analyzed, summarized, or otherwise processed on a server using a variety of procedures. The server 10 may also be configured to use the collected data from one or more kiosks 20 as a factor in determining what content to transfer to each kiosk 20, what advertising messages to display at each kiosk 20, etc.

As depicted at block 78 in FIG. 3, the collected data can then be shared and made available to any external parties to the system. For example, if a community of users has been formed, any desired collected data may be shared among the community, including making the data about a particular community available to a single user or non-user of that community. In another example, the collected data can be shared with a content provider or a location provider such as sharing collected data about security with the operator of a corrections facility.

The collected data may be communicated to any external party using any known technique. For example, in one technique, communication among a community may be initiated by the user using, for example, instant messaging, blogs, e-mail, EDI, or uploading of data to a separate computer that is accessible to one or more members of the community. In a second technique, the external party may be provided with access to the server 10 on which kiosk data is stored, or another server controlled by the same or an affiliated entity that controls the server. This technique permits the external party to access the collected data at times determined by them. One example of a method by which an external party may access the collected data on a server 10 is via a Web page provided by the entity that controls the server 10. In one embodiment, this Web page may be provided by the same Web server that provides a Web page embodiment of a kiosk 20, with the server 10 providing appropriate information.

Thus, the collected data can be shared with the external party by either transmitting the data to them or by allowing them to access the system—either directly or indirectly—through the Web page/Web portal. In the former situation, the collected data may be optionally collated, analyzed, summarized, or otherwise processed using a variety of steps. This situation may allow the operator of the system to perform the analysis, filter the results, and/or customize the data that is sent to the external party, in the latter situation, the external party can view the collected data before (or as) it is received from the kiosk(s) or anytime during the analysis, filtering, or customization process. Of course, access to the system by the external party can be established using any parameters desired by the operator of the system and/or the individual user that provided the data, i.e., access may be limited to only certain portions of the collected data.

In certain situations, the collected data can be sent directly to other kiosks. Such situations can be advantageous when the external party wants to access data from a group of kiosks in the same location or vicinity (i.e., a primary and a secondary kiosk). In these situations, the data can be transmitted to-or-from the secondary kiosk, allowing the external party to access the collected data for both the primary and the secondary kiosks. This situation may give the external party more access to the raw data that has been collected, but does not necessarily allow the operator of the system to analyze, filter, or customize the report. Again, access to the collected data can be established using any parameters desired by the operator of the system, i.e., access may be limited to only certain portions of the collected data.

In some embodiments, the collected data may be purposefully reported to content providers, including copyright owners. If content providers, copyright owners, or others are due royalties or other payments based on use or sale of content, such royalties or other payments may be made from the operator of a server to the appropriate recipient using automated means as are known in the art, based upon sales and demographic data. A system operator can also authorize any third party to receive reports and restrict the reports that the third party can access.

All of the collected data from the distribution device(s), Web portal, and/or Web page can be used for numerous purposes, in some aspects, the collected data can be used to enhance and/or customize the operation of the system. In other aspects, the collected information can be part of the general and specific market research data that can be used by the operator of the system as known in the art. In yet other aspects, the collected information can be used to customize the content and/or the advertising provided to the external party. For example, the collected data can be used to customize the content delivered to the kiosk or be used to predict the types/genre of media that will be popular to a given user. Alternatively, the collected data can be used to customize the digital content by the time of day, the geographic location, etc.

The collected data can be used to customize the advertising or promotions directed to the user. The advertising or promotions may include messages used to market, promote, or sell products or services; or to enhance brand recognition, as well as training materials, entertainment content, community or location information, and other similar materials. The advertising or promotions may also include video clips, audio clips, ring tones, printed coupons, promotional codes, brochures, literature, images, giveaways, discounts associated with digital content, or other promotional or brand-related content. In some embodiments, the advertising or promotions may be presented through video and/or audio presentations, animated PowerPoint presentations, flash programs, banners, pop-ups, screen-savers, wallpapers, posters, digital sampling, cost-per-pixel, cost-per-click, advertisement images, printed advertisements, trademarks and other similar advertisements. One example of the advertising includes the promotion of artists or performers, whose products or content are available for sale on the kiosk. In still another example of the use of the collected data, it may be used in any method of viral marketing.

In addition to any previously indicated variation, numerous other modifications and alternative arrangements may be devised by those skilled in the art without departing from the spirit and scope of the invention and appended claims are intended to cover such modifications and arrangements. Thus, while the invention has been described above with particularity and detail in connection with what is presently deemed to be the most practical and preferred aspects of the invention, it will be apparent to those of ordinary skill in the art that numerous modifications, including but not limited to, form, function, manner of operation and use may be made without departing from the principles and concepts set forth herein.

The invention claimed is:

1. A system for distributing digital content to a user, comprising:
   a storage device, the storage device including a storage component storing digital content;
   a portable distribution device communicatively coupled to the storage device to receive digital content from the storage device, and configured to distribute the digital content to a user; and
   a receiving device to receive user-purchased digital content from the portable distribution device, wherein the receiving device includes unique identifying data including data that identifies a specific individual user and including an institution identifier identifying a location partner, wherein the receiving device communicates the unique identifying data to the portable distribution device, wherein the unique identification data enables the receiving device to work only with the portable distribution device at a predefined location;
   wherein the portable distribution device limits the access time by the user to the portable distribution device according to the unique identification data communicated from the receiving device, the access time being limited according to at least one of a specified amount of time for each interaction, a number of interactions within a given time period, or to specified periods of time; and
   wherein the storage device limits the digital content that may be distributed by the portable distribution device to the receiving device to digital content approved by the location partner based on the unique identifying data communicated from the receiving device.

2. The system of claim 1, wherein the storage device comprises a server.

3. The system of claim 1, wherein the portable distribution device comprises a kiosk with wireless communications capability.

4. The system of claim 1, wherein the portable distribution device comprises a portable distribution device is at least in part controlled by the location partner.

5. The system of claim 1, wherein the distribution device comprises a kiosk that can also store the digital content.

6. The system of claim 1, wherein the distribution device is located within a correctional facility.

7. The system of claim 6, wherein the receiving device receives content sent to the distribution device from a party remote from the correctional facility.

8. The system of claim 6, wherein the storage device comprises a means for accepting payment for the digital content from a party remote from the correctional facility.

9. The system of claim 1, wherein the unique identifying data comprises a serial number.

10. The system of claim 1, wherein the unique identifying data comprises user account information.

11. The system of claim 1, wherein the receiving device further comprises bio-information specific to the individual user.

12. A system for distributing digital content to a user, comprising:
   a storage device, the storage device including a storage component storing digital content;
   a portable distribution device configured to distribute the digital content to a user, wherein the portable distribution device is communicatively coupled to a location partner; and
   a receiving device to receive user-purchased digital content, wherein the receiving device collects unique identifying data including data that identifies a specific individual user and including an institution identifier identifying the location partner, wherein the receiving device verifies the unique identifying information prior to receiving the digital content, and wherein the unique identification data enables the receiving device to work only with the portable distribution device at a predefined location;
   wherein the portable distribution device limits the access time by the user to the portable distribution device according to the unique identification data collected by the receiving device, the access time being limited according to at least one of a specified amount of time for each interaction, a number of interactions within a given time period, or to specified periods of time; and wherein the storage device limits the digital content that may be distributed by the portable distribution device to the user to digital content approved by the location partner based on the unique identifying data communicated from the receiving device.

13. The system of claim 12, wherein the storage device comprises a server.

14. The system of claim 12, wherein the portable distribution device is controlled at least in part by the location partner.

15. The system of claim 12, wherein the receiving device comprises one or more user devices, each user device associated with unique identifying data.

16. The system of claim 15, wherein the unique identifying data further comprises bio-information specific to the individual user.

17. The system of claim 12, wherein the unique identifying data enables use of the receiving device with a specific portable distribution device.

18. The system of claim 17, wherein the receiving device receives content customized for a specific user based on the unique identifying data.

19. The system of claim 12, wherein the storage device comprises a means for accepting payment for the digital content from a party remote from the distribution device.

* * * * *